United States Patent
Fujioka et al.

(10) Patent No.: US 6,938,725 B2
(45) Date of Patent: Sep. 6, 2005

(54) STEERING CONTROL APPARATUS (75) Inventors: Takehiko Fujioka, Kanagawa (JP);
Theerawat Limpibunterng, Tokyo (JP); Hajime Oyama, Tokyo (JP); Noriyuki Inoue, Tokyo (JP); Masaya Endo, Tokyo (JP)

(73) Assignees: Mitsubishi Denki Kabushiki Kaisha, Tokyo (JP); Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/796,285

(22) Filed: Mar. 10, 2004

(65) Prior Publication Data

US 2005/0039971 A1 Feb. 24, 2005

(30) Foreign Application Priority Data

Aug. 22, 2003 (JP) ........................... 2003-299129

(51) Int. Cl.[7] ................................. B62D 5/04
(52) U.S. Cl. .................... 180/446; 701/42; 180/402
(58) Field of Search .................. 180/443, 446, 180/402; 701/41, 42

(56) References Cited

U.S. PATENT DOCUMENTS

| | | | | |
|---|---|---|---|---|
| 5,257,828 A | * | 11/1993 | Miller et al. | 180/446 |
| 5,623,409 A | * | 4/1997 | Miller | 701/41 |
| 5,698,956 A | * | 12/1997 | Nishino et al. | 318/432 |
| 5,979,587 A | * | 11/1999 | Liubakka et al. | 180/446 |
| 6,686,845 B2 | | 2/2004 | Oyama | |
| 6,838,844 B2 | * | 1/2005 | Shimizu et al. | 318/287 |
| 2003/0014168 A1 | * | 1/2003 | Williams | 701/41 |

FOREIGN PATENT DOCUMENTS

JP    2000-128002    9/2000

OTHER PUBLICATIONS

Krämer et al., "Potential Functions And Benefits Of Electronic Steering Assistance", *Robert Bosch Gmbh*, 1996, pp. 2678–2704, Germany.

* cited by examiner

*Primary Examiner*—Kevin Hurley
(74) *Attorney, Agent, or Firm*—Leydig, Voit & Mayer, Ltd.

(57) ABSTRACT

In the control of an electric power steering apparatus, where so-called lead steering control is performed in which a steering wheel angle signal is output through a lead filter to correct reaction delay of a driver and a vehicle, a delay in control response occurs due to feedback of a road surface reaction force torque. When road surface reaction force torque is fed back to the steering wheel, it is added through a low-pass filter having a time constant equal to a reaction delay time constant of a driver. A sum signal is output through a lead filter to a second motor for controlling a steering shaft.

5 Claims, 9 Drawing Sheets

STEERING CONTROL APPARATUS

BACKGROUND OF THE INVENTION

1. Field of the Invention

The present invention relates to a steering control apparatus for controlling a wheel angle by an electric motor in a vehicle in which an axial direction (wheel angle) of a wheel is controlled to control a traveling direction of the vehicle.

2. Description of the Related Art

Conventionally, there is known a steer-by-wire (SBW) mechanism, that is, a mechanism in which a handle shaft coupled with a handle and a steering mechanism for steering a tire are mechanically separated from each other, and both are controlled by using a motor or the like independently of each other.

For example, patent document 1 discloses a steer-by-wire control apparatus for determining a steering reaction force torque on the basis of a steering state (angle of a handle, and others) and a steering angle of a tire (front wheel for steering). According to the technique disclosed in this document, only a handle angle is mainly used as the steering state which becomes input information, so that the steering reaction force torque acting on a handle shaft is determined.

Besides, there is also a method in which a road surface reaction force torque is detected, and this is multiplied by a specified torque gain to determine a steering reaction force torque.

In the steer-by-wire mechanism, as compared with a conventional steering mechanism in which a handle and a tire are coupled by a mechanical link, it becomes possible to perform wide control (meaning that the change or the like of a control characteristic and a control constant becomes easy).

In such a control, so-called lead steering, in which a vehicle reaction delay or a reaction delay of a driver is compensated by causing the response performance of a front wheel angle with respect to a steering wheel input, to implement a first order lead, is a well-known control.

Conventionally, especially in the steer-by-wire mechanism, since a front wheel angle can be controlled without interfering with a handle angle, it has been considered that there is no uncomfortable feeling for a driver in the lead steering.

In the steer-by-wire (SBW) mechanism, or in a mechanically linked steering mechanism, a driver should feel a steering reaction force torque caused by a road reaction force torque to improve, steering feeling. However, in the foregoing lead steering control state, when a force proportional to the road surface reaction force torque is simply returned as the steering reaction force torque to the steering wheel, a state interfering with the driver occurs due to the variation, or the like, of the torque. To interfere with a driver means, for example, a state in which the driver, having felt a torque, adds still another correction steering action, and smooth steering is not performed.

[Patent document 1] JP-A-2000-128002
[Patent document 2] JP-A-2002-154345
[Non-patent document 1] Kramer, "Potential Function And Benefits Of Electronic Steering Assistance", CSAT, Czech Republic, 1996

SUMMARY OF THE INVENTION

According to the conventional steering control apparatus, in the lead steering control, when the force proportional to the road surface reaction force torque is simply returned as the steering reaction force torque to the handle, it interferes with the driver because of the variation or the like of the torque. That is, there has been a problem that the driver having felt the torque in the arm adds still another correction steering action, and as a result, the control of the lead steering does not effectively work, and the steering feeling is also not improved.

A steering control apparatus of this invention includes a handle angle detection part for detecting a rotation angle of a handle mounted in a vehicle and sending a handle angle signal, a road surface reaction force torque detection part for detecting a road surface reaction force torque from a front wheel of the vehicle and sending a road surface reaction force torque signal;

a lag arithmetic part for calculating a steering reaction force torque on the basis of a first order lag filter having a previously determined specified time constant and the road surface reaction force torque;

a first motor fixed to the handle and for generating the steering reaction force torque on the handle;

a first control part for controlling the first motor on the basis of the steering reaction force torque;

a lead arithmetic part for calculating a steering angle signal of the front wheel on the basis of a first order lead filter having a same time constant as the specified time constant and the handle angle signal;

a second motor fixed to the front wheel and for controlling the front wheel angle; and a second control part for controlling the second motor on the basis of the steering angle signal.

According to the steering control apparatus of this invention, in addition to differential compensation for the handle angle, the compensation for the steering reaction force torque as important information relating to vehicle behavior for a driver is added, so that interference with a driver operation is reduced and the operation delay of the driver is compensated, and accordingly, there are obtained operations and effects that the responsibility and stability of a human-automobile control system is improved, a steering feeling is improved, and driving at the time of steering such as lane change becomes easy.

The foregoing and other object, features, aspects and advantages of the present invention will become more apparent the following detailed description of the present invention when taken in conjunction with the accompanying drawings.

DETAILED DESCRIPTION OF THE INVENTION

Figure 1:
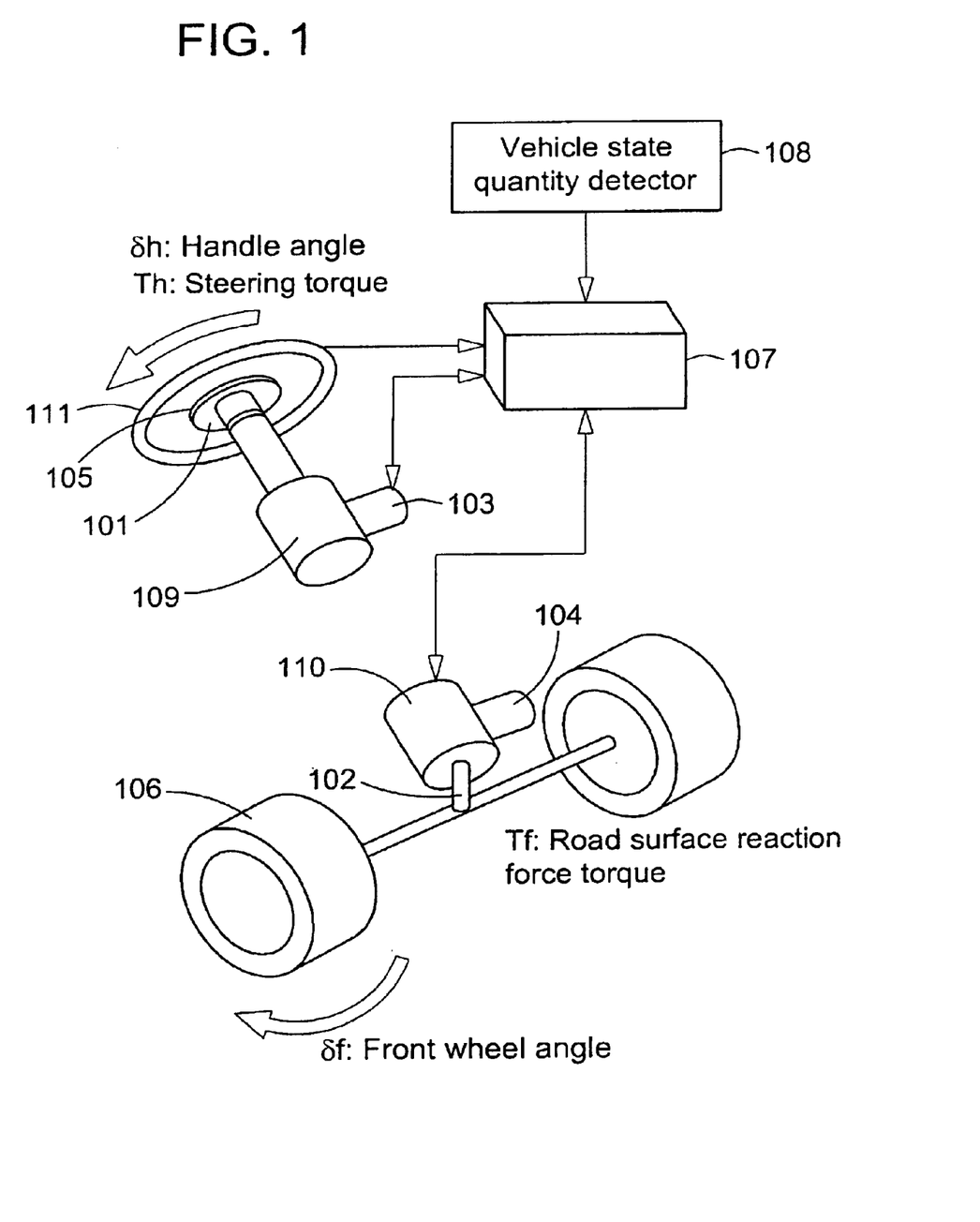
FIG. 1 shows a structural view of a steering apparatus of a vehicle to which a steering control apparatus according to embodiment 1 of the invention is applied.

Embodiment 1:

FIG. 1 shows a structure of a steering control apparatus of the invention.

A handle 111 and a front wheel 106 are not mechanically coupled with each other, and there are included a first motor 103 for generating a steering reaction force torque on the handle 111, and a second motor 104 for controlling a front wheel angle $\delta_f$ of the front wheel (hereinafter also called a wheel) 106. The handle 111 is provided with a handle angle detection part (not shown) for detecting its rotation angle and sending a handle angle signal.

Figure 2:
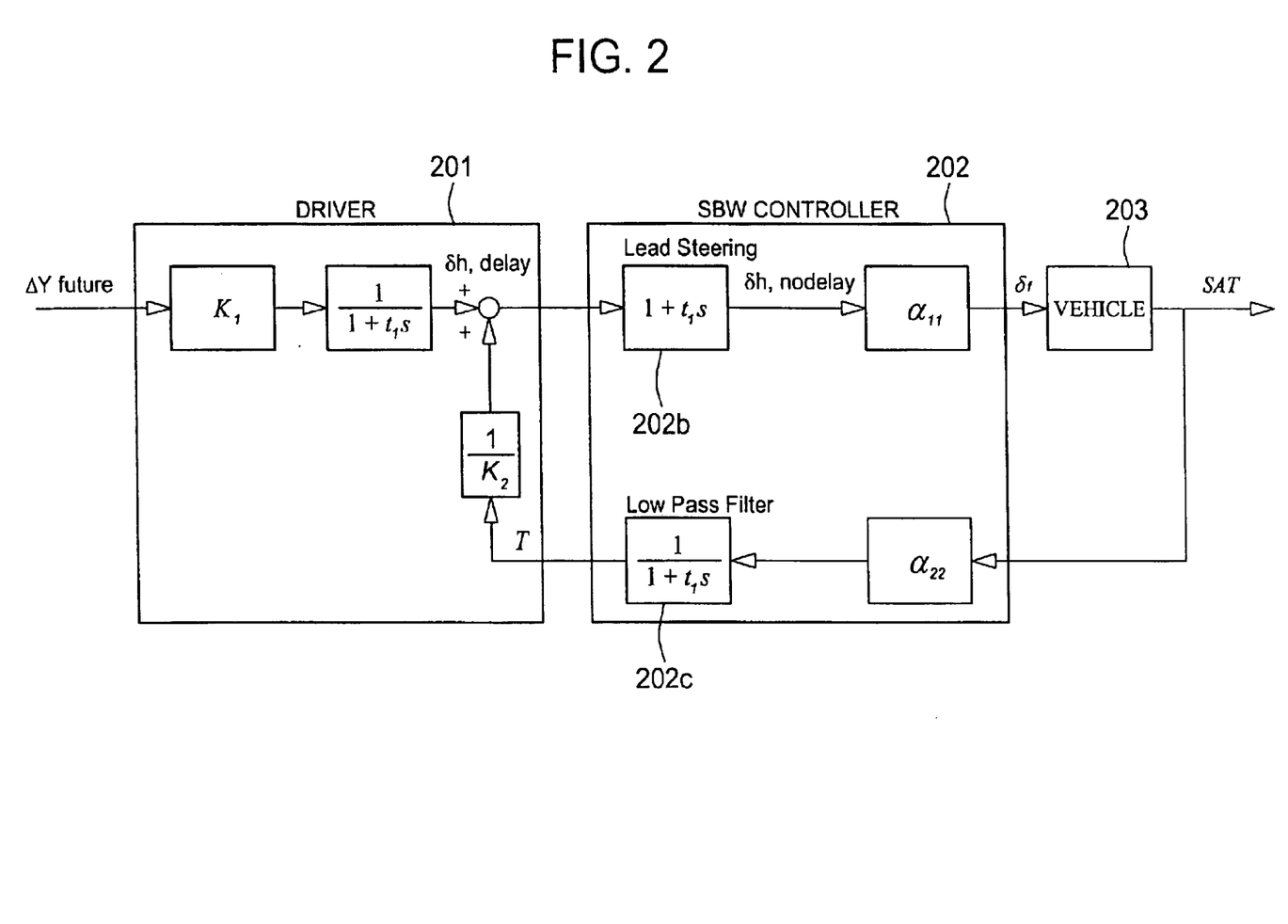
FIG. 2 shows a control block diagram for explaining the steering control apparatus of the invention used in the structure of FIG. 1.

Besides, FIG. 2 shows an explanatory view in which a driver (hereinafter referred to as a person or a driver) is added and a human-automobile control system is divided into control blocks.

A road surface reaction force torque sensor (road surface reaction force torque detection part) 102 measures a road surface reaction force torque generated on the front wheel 106 at the time of steering and sends a road surface reaction force torque signal. In response to the road surface reaction force torque signal, the first motor 103 generates a first control torque on a handle shaft. Besides, it is used for accurately controlling a torque at the time when the second motor 104 is made to generate a second control torque to control the front wheel angle. Besides, although a detailed explanation will be omitted, in order to realize a better steering feeling and operation stability, there is also a case where a not-shown sensor is provided in a vehicle state quantity detector 108 to detect a yaw rate, horizontal G, slip angle, and road surface frictional coefficient $\mu$.

Besides, in order to perform the respective motor controls, electric current flowing to the motors and voltage applied between motor terminals are also taken in.

At a normal time, dynamically, a relation among a steering reaction force torque T, a road surface reaction force torque $T_f$, a handle angle $\delta_h$, and a front wheel angle $\delta_f$ is controlled so as to satisfy a following relation, where a handle angle gain is $\alpha_{11}$ and a torque gain is $\alpha_{22}$.

$$\delta_f = \alpha_{11} \cdot \delta_h \text{ and } T = \alpha_{22} \cdot T_f \tag{1}$$

$\alpha_{11}$ and $\alpha_{22}$ are the ratio of the handle angle to the front wheel angle and the reciprocal of a so-called overall steering gear ratio, and are respectively controlled so as to hold the relation (1) by the second motor 104 for controlling the front wheel angle of FIG. 1 and the first motor 103 for controlling the steering reaction force torque. In the description of the invention, for the purpose of facilitating understanding, the description will be given on the assumption that $\alpha_{11}$ and $\alpha_{22}$ are fixed (constant value). In the case of a general passenger car, their values are about 1/15 to 1/20. However, in order to realize a function of a steering apparatus called a variable gear system, it is also possible to change them to, for example, 1/10 at low speed and 1/30 at high speed.

Here, an expression (2) indicates a model expressing the operation (motion) state of respective parts in the case where a driver performs a lane change operation by the system of FIG. 1, which is culculated using 1st-order look-ahead algorithm.

$$\delta_{h,delay} = (K_1/(1+t_1S))\Delta Y_{future} + T/K_2 \tag{2}$$

$\Delta Y_{future}$ is a future lateral deviation to the target lateral position.

$t_1$ is a delay time of a driver.

$K_1$ is a look-ahead steering wheel angle gain.

$K_2$ is an arm spring constant of a driver.

$\delta_h$ indicates a handle angle operated by the driver, and for the purpose of facilitating understanding, a signal before compensation, which is not subjected to compensation described below, is denoted by $\delta_{h,delay}$.

Figure 3:
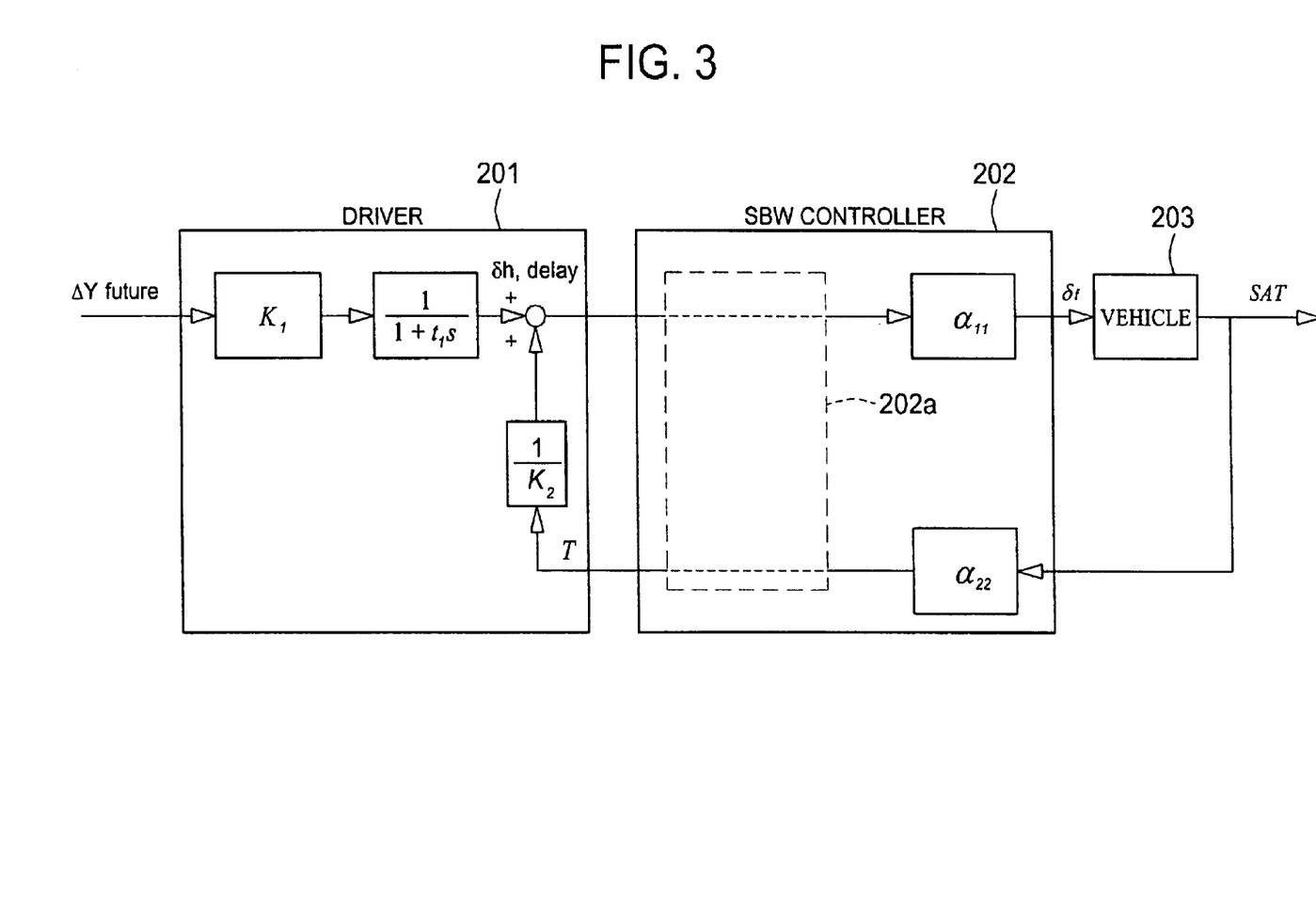
FIG. 3 shows an explanatory block diagram in which part of FIG. 2 is extracted for operation explanation.

Before the explanation of FIG. 2 is given, in the sequence of the explanation, first, a main portion of control in the whole relation of a human-vehicle system (signal transmission block diagram) is extracted from FIG. 2 and is shown in FIG. 3, and the expression (2) will be described with reference to this drawing.

In FIG. 3, a driver 201 receives a deviation ($\Delta Y_{future}$ in FIG. 3) at a forward watch distance in a direction toward which the driver 201 wants to change a course, or an influence of a steering reaction force torque (T of FIG. 3) felt at a handle, or other influences, and operates a handle angle $\delta_h$. This handle angle $\delta_h$ is multiplied by a handle angle gain $\alpha_{11}$ in a steer-by-wire control apparatus (also called an SBW controller) 202, and a front wheel angle $\delta_f$ is given to a vehicle 203. A road surface reaction force torque (SAT) is detected from a steering shaft (not shown) of a wheel, is multiplied by a torque gain $\alpha_{22}$ in the SBW controller 202, and is fed back to the arm of the driver 201 as the steering reaction force torque T. This circuit is an arithmetic part for calculating the steering reaction force torque on the basis of a previously determined constant and the road surface reaction force torque.

Here, to compensate the response delay of the driver of the expression (2) is equivalent to give the vehicle 203 a handle angle $\delta_h$ as indicated in an expression (3), that is, one in which the delay of $1/(1+t_1S)$ of the driver 201 is cancelled by adding a compensation element into a dotted line 202a shown in FIG. 3.

$$\delta_{h,nodelay} = K_1 \Delta Y_{future} + T/K_2 \tag{3}$$

For facilitating understanding, the handle angle output of the driver after the compensation is added is denoted by $\delta_{h,nodelay}$. Here, from an idea of a conventional lead steering (one in which only compensation of causing a handle angle signal to pass through a lead filter 202b is performed as shown in FIG. 4, is expressed like this), as shown in FIG. 4, the first order lead compensation $(1+t_1S)$ 202b for compensating the driver delay is added to only the steering signal $\delta_{h,delay}$.

Figure 4:
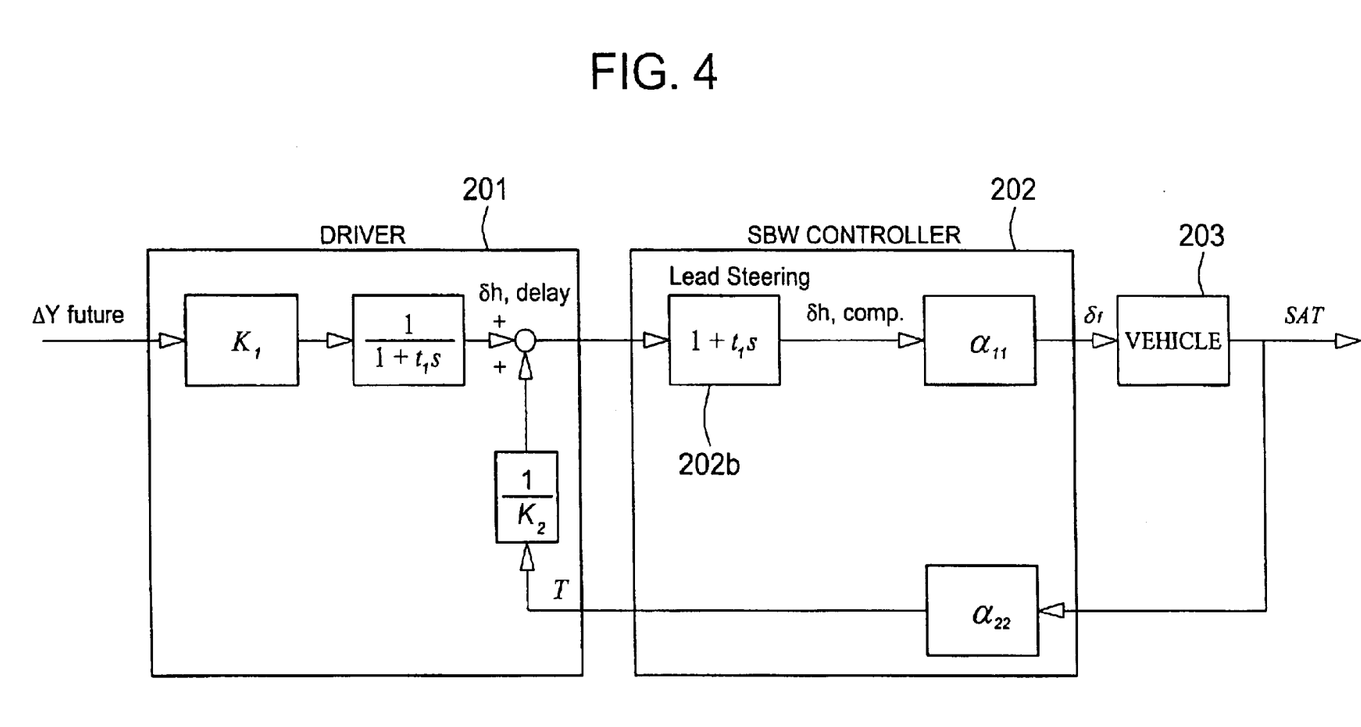
FIG. 4 shows an explanatory block diagram in which part of FIG. 2 is extracted for operation explanation.

Then, in the case of FIG. 4, a handle angle (denoted by $\delta_{h,comp}$ for differentiation) given to the vehicle is indicated by an expression (4). The first order lead compensation 202b is a lead arithmetic part.

$$\begin{aligned}\delta_{h,comp} &= [(K_1/(1+t_1S))\Delta Y_{future} + T/K_2](1+t_1s) \\ &= K_1 \Delta Y_{future} + ((1+t_1s)/K_2)T \\ &\neq \delta_{h,nodelay}\end{aligned} \tag{4}$$

$\delta_{h,comp}$ of the expression (4) is apparently different from $\delta_{h,nodelay}$ of the expression (3), and it is understood that the compensation is insufficient by receiving the influence that the lead compensation also acts on the feedback of the road surface reaction force caused by the front wheel angle.

As stated above, in the human-automobile system in which the road surface reaction force torque is fed back to the driver, when the steer-by-wire (SBW) system is considered, it is understood that the phase lead compensation simply performed only to the front wheel angle as in the prior art is insufficient.

In order to solve the above described problem and to realize the ideal compensation indicated in the expression (3), the steering reaction force torque is calculated by multiplying the road surface reaction force torque SAT by a first order lag low-pass filter 202c having the substantially same time constant as the driver delay (this circuit is called a lag arithmetic part). FIG. 2 is the control block diagram obtained in this way.

At this time, the handle angle $\delta_h$ given to the vehicle is expressed by an expression (5).

$$\delta_h = [(K_1/(1+t_1s))\Delta Y_{future} + \{1/(1+t_1s)\}T/K_2](1+t_1s) \quad (5)$$
$$= K_1 \Delta Y_{future} + T/K_2$$
$$= \delta_{h,nodelay}$$

$\delta_h$ of the expression (5) is the same as $\delta_{h,nodelay}$ of the expression (3), and the delay of the driver is compensated.

Incidentally, as a way of selecting $\alpha_{11}$ and $\alpha_{22}$, fixed values satisfying $\alpha_{11}*\alpha_{22}$=const may be adopted, however, such values that the vehicle motion performance becomes optimum through the look-ahead steering wheel angle gain $K_1$ of the driver and the arm spring constant of a driver $K_2$ of the arm are calculated on the basis of a vehicle speed and the like, and may be used as varying values.

Besides, although the driver delay time $t_1$ may be made constant at, for example, a typical value of 0.5 second as a characteristic of the driver, when a driver state estimation unit disclosed in the patent document 2 exists, they may be varied on the basis of its result. Incidentally, in the case where $t_1$ is changed, although the time constants of both the lead/lag filters have only to be changed, the effect can be obtained by changing only one of both.

As stated above, in the case where the time constant is changed, the time constant is changed by software, or plural kinds of filters are provided in advance, and it may be changed by hardware. Such change means is called time constant setting means.

Figure 5:
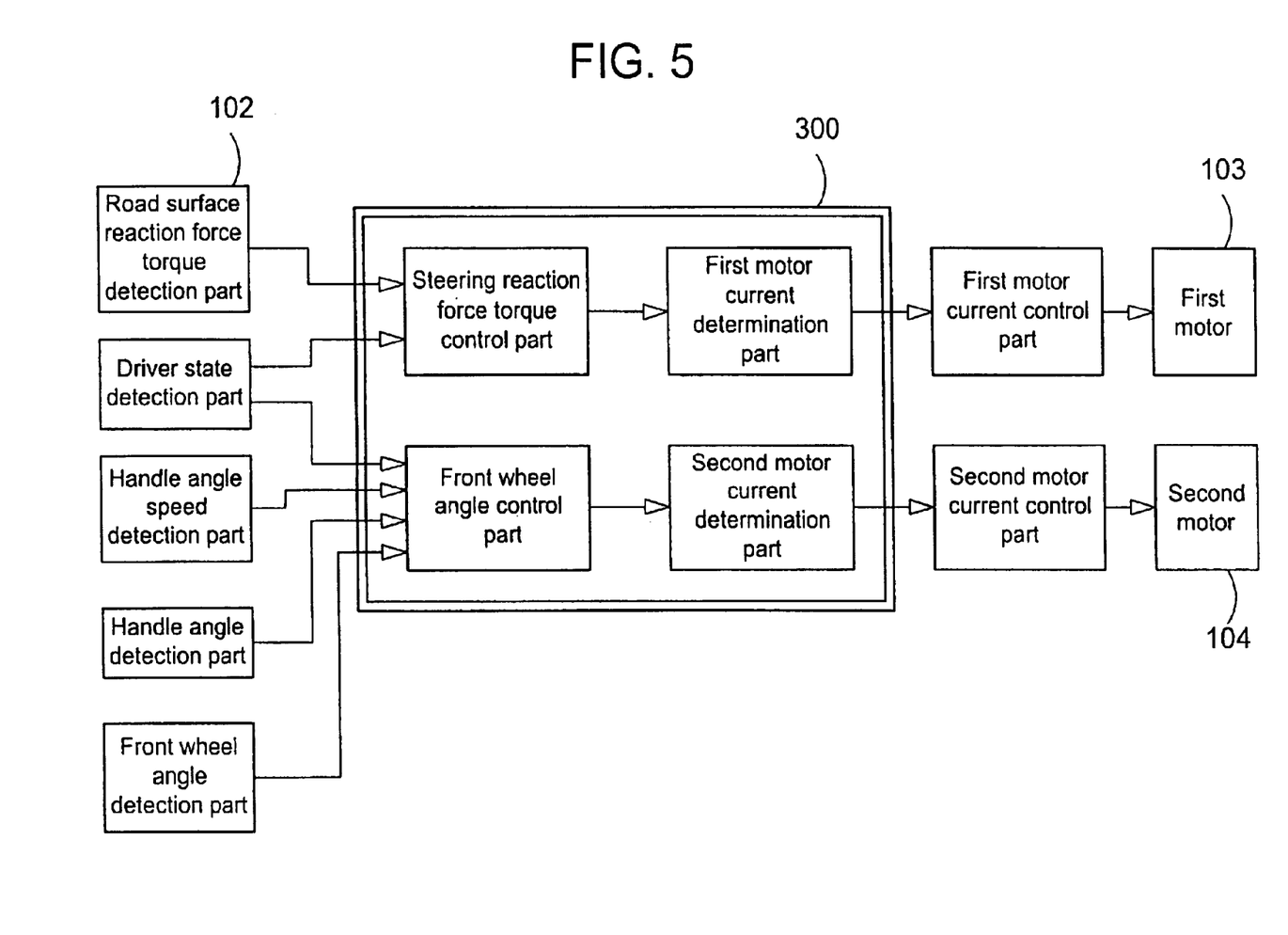
FIG. 5 shows a block diagram for explaining the structure of FIG. 1 in a case where the control block of FIG. 2 is applied.

FIG. 5 shows a structural view expressing the whole structure of the steering control apparatus shown in FIG. 2. A portion surrounded by a double line in the drawing is an arithmetic part 300 for calculating a value of current applied to the motor, and is constructed by, for example, an arithmetic unit including a not-shown microprocessor and a memory, and is housed in the inside of a steering control controller 107 of FIG. 1. In the arithmetic part 300, a target value of the current is calculated from the road surface reaction force torque sensor signal SAT, the handle angle signal $\delta_h$, the handle angle speed signal, and the front wheel angle signal $\delta_f$ of FIG. 2, and the real currents of the first and the second motors are current-controlled. Then, the motors generate predetermined torques obtained by multiplying the current values by the torque constant and the gear ratio (from the motor to the steering shaft), and control the steering reaction force torque and the front wheel angle shaft torque at the time when the driver steers. A block (first motor current control part) for controlling the first motor 103 is called a first control part. A block (second motor current control part) for controlling the second motor 104 is called a second control part.

In the above description, the description has been given on the assumption that the element to determine the control quantity of the steering control apparatus is constituted by only main signals necessary for control, for example, a road surface reaction force torque detector, a handle angle detector, and a front wheel angle detector. However, as specific devices, in addition to these, it is needless to say that a motor speed signal, a motor acceleration signal, a motor current, a yaw rate, a horizontal direction acceleration and the like may be added as control signals to obtain better drivability.

Since attachment places of the road surface reaction force torque sensor, the handle angle sensor, and the front wheel angle sensor are well known, the detailed explanation will be omitted.

Besides, here, although the description has been given on the assumption that the detection of the road surface reaction force is performed by the realization method for detecting it by using the road surface reaction force torque sensor, the road surface reaction force torque can also be obtained by calculation using the motor current of the second motor 104 for controlling the front wheel angle and the motor acceleration, and even when such is done, the same effect can be obtained.

That is, when torque constant of the motor is $K_{t2}$, current of the motor is $I_f$, inertia of the motor is $J_2$, and acceleration of the motor is $d\omega_2/dt$, the road surface reaction force $T_f$ is obtained by a following expression (6).

$$T_f = I_f K_{t2} - J_2 \cdot d\omega_2/dt \quad (6)$$

Also in other embodiments described below, the road surface reaction force torque can be obtained by using any of the road surface reaction force torque detector and the calculation.

According to the steering control apparatus shown in FIGS. 2 and 5, in addition to the differential compensation for the handle angle, by adding the compensation for the road surface reaction force torque which gives the information relating to the vehicle behavior to the driver, the interference with the driver operation is reduced, and the operation delay of the driver is compensated, so that the responsibility and stability of the human-automobile system is improved, the driving load of the driver at the time of steering such as the lane change is decreased, and the driving operation becomes easy.

Figure 6:
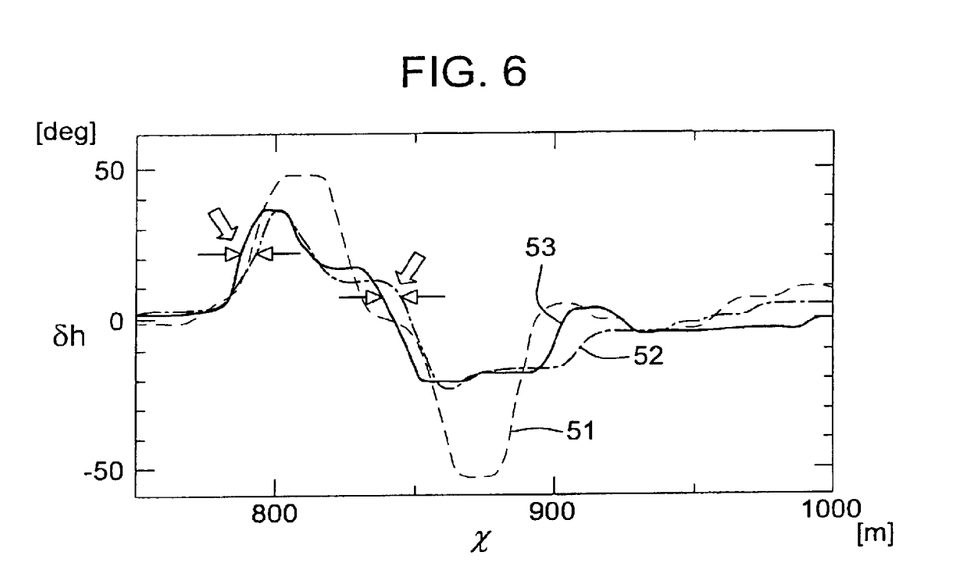
FIG. 6 shows a characteristic explanatory view for explaining the effect of the structure of FIG. 2.

As a specific example, FIG. 6 shows effects appearing in various characteristics at the time of a lane change operation. The horizontal axis of FIG. 6 indicates the traveling movement distance, and the vertical axis indicates the handle angle.

In FIG. 6, a dotted line 51 indicates a response characteristic in the case where steering control without lead compensation (shown in FIG. 2) is performed; an alternate long and short dashed line 52, a response characteristic in the case where the lead steering control to control only the front wheel angle shown in FIG. 4 is performed; and a solid line 53, a response characteristic in the case of the embodiment 1.

When a judgment is made from the quantity of the handle angle of the characteristic 53, although the effect of the lead steering is not different from the characteristic 52, at the time of the start of steering or the correction steering (white arrow parts), since the steering reaction force torque caused by the road surface reaction force torque is reduced by the low-pass filter 202c shown in FIG. 2, as compared with the characteristic 52, the handle angle can be quickly increased, and as a result, it can be confirmed that the responsibility is improved in the human-automobile system.

Figure 7:
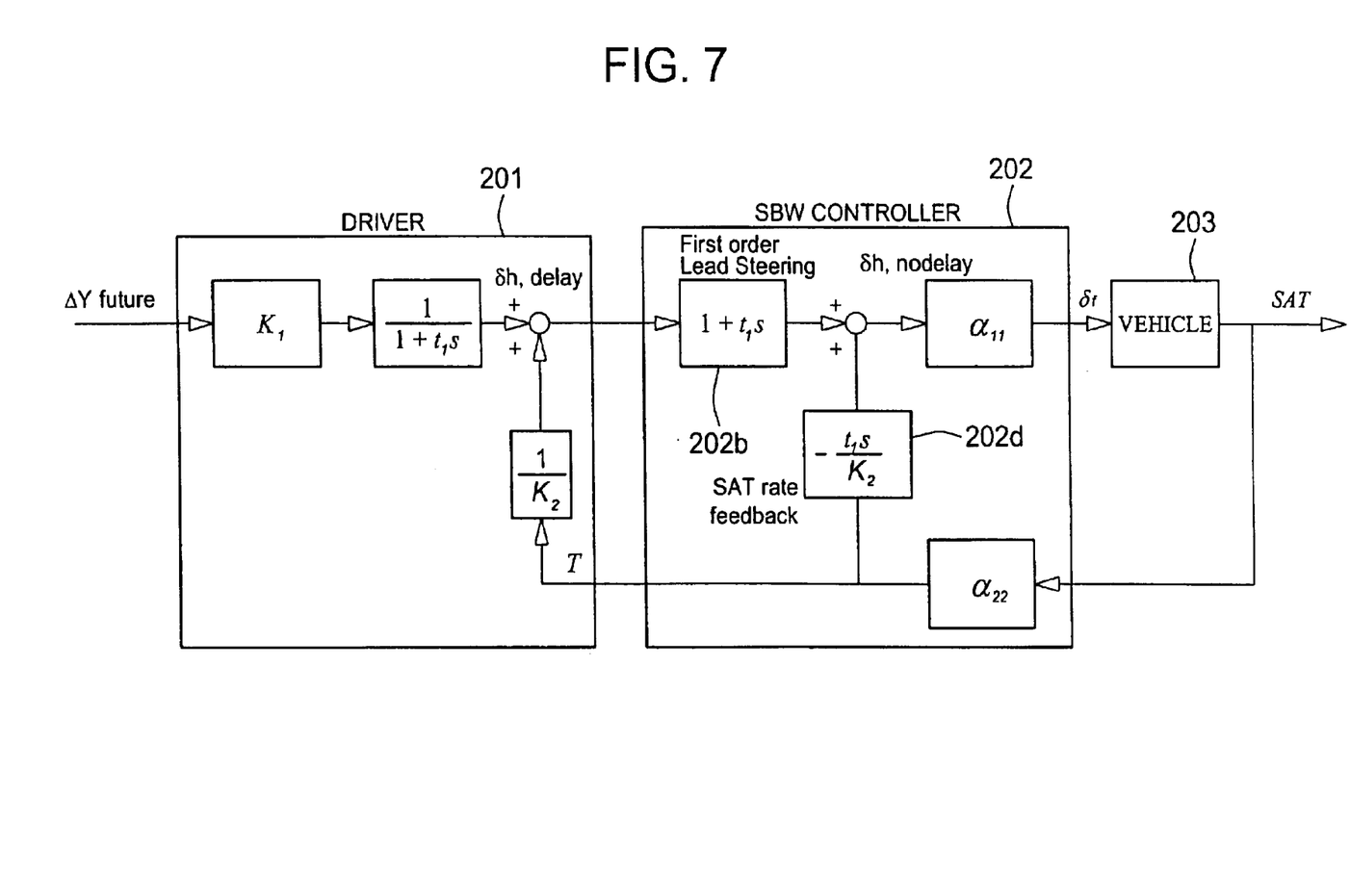
FIG. 7 shows a control block diagram of a steering control apparatus of embodiment 2.

Embodiment 2:

Another structure (not using the low-pass filter 202c of FIG. 2) for realizing the expression (3) of the embodiment 1 will be described with reference to FIG. 7. FIG. 7 is a control block diagram of a steering control apparatus of the embodiment 2. What is shown in FIG. 7 is for directly correcting a difference between the expression (3) and the expression (4), that is, $T(t_1 S)/K_2$ by using a present value of a road surface reaction force torque. That is, a compensation element 202d is added. The compensation element 202d is also called a road surface reaction force torque rate calculation part or a correction arithmetic part.

In the case of FIG. 7, the handle angle given to the vehicle is indicated by an expression (7).

$$\delta_h = [(K_1/(1+t_1 s))\Delta Y_{future} + T/K_2](1+t_1 s) - t_1 s(T/K_2) \quad (7)$$
$$= K_1 \Delta Y_{future} + T/K_2$$
$$= \delta_{h,nodelay}$$

That is, $T(t_1 S)/K_2$ is obtained by the differential compensation from the road surface reaction force torque, and this is added to $\delta_h$ at the output side of the first order lead filter 202b. This circuit is called a lead differential correction arithmetic part. By this, the delay of the driver is compensated.

Incidentally, as a way of selecting $\alpha_{11}$ and $\alpha_{22}$, fixed values satisfying $\alpha_{11}*\alpha_{22}$=const may be adopted, however, such values that the vehicle motion performance becomes optimum through the handle gain $K_1$ of the driver and the spring modulus $K_2$ of the arm are calculated on the basis of a vehicle speed and the like, and may be used as varying values.

Besides, although the driver delay time $t_1$ may be made constant at a typical value, for example, 0.5 second as a characteristic of the driver, when the driver state estimation unit disclosed in the patent document 2 exists, it may be varied on the basis of its result.

Besides, a proportional gain $1/K_2$ is the reciprocal of the arm spring constant of the driver, and as a constant value, a typical value as a driver characteristic, for example, 15 Nm/rad may be used, however, it may be varied similarly to the driver delay time by using the foregoing driver state estimation unit.

Figure 8:
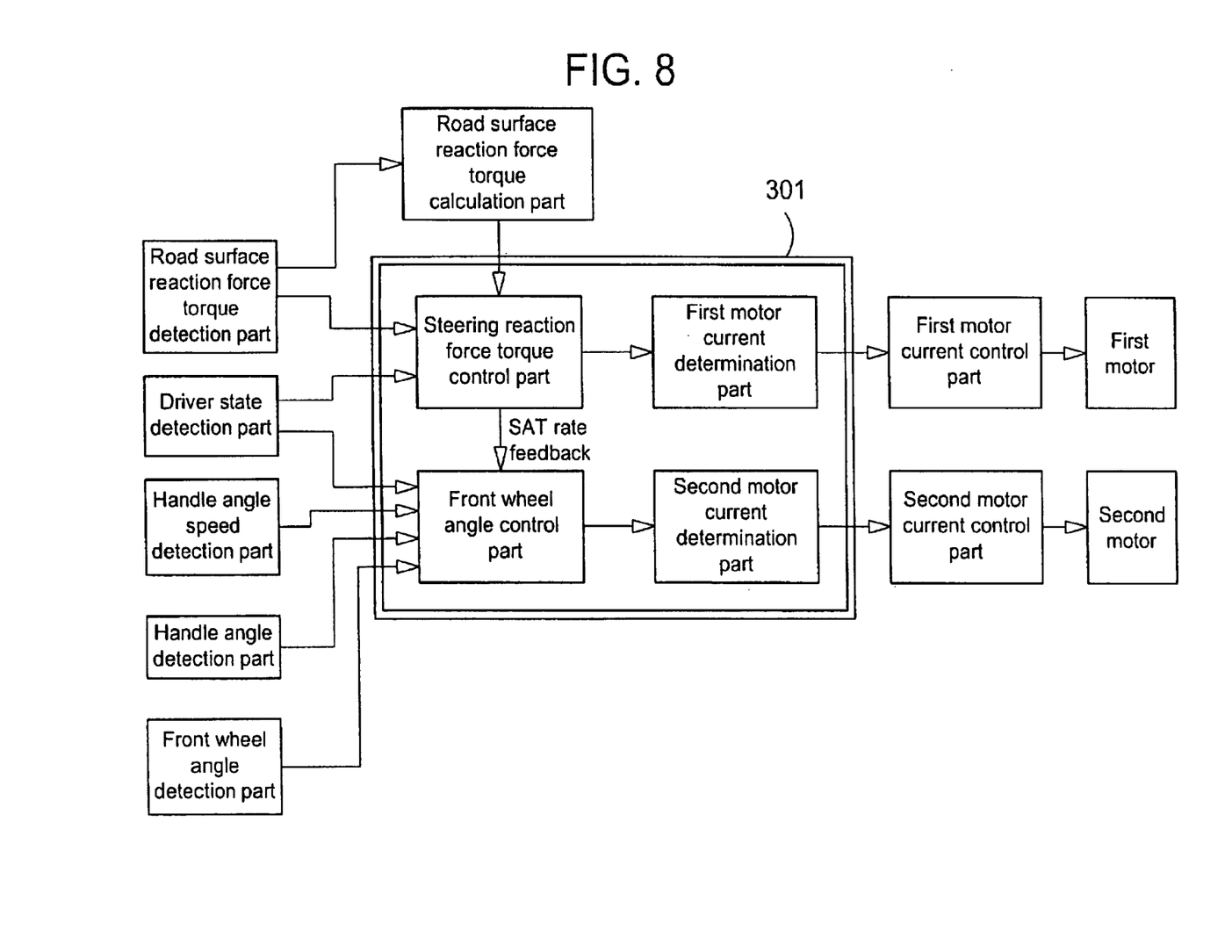
FIG. 8 shows a block diagram for explaining the structure of FIG. 1 in a case where the control block of FIG. 7 is applied.

FIG. 8 shows a view showing the structure of the electrical steering apparatus of the embodiment 2 for realizing the structure of the control block diagram of FIG. 7. A portion 301 surrounded by a double line in the drawing is an arithmetic part block for calculating values of currents applied to motors.

Besides, in FIG. 7, on the basis of the road surface reaction force torque detected by a road surface reaction force torque detection part, the road surface reaction force torque rate calculated by the road surface reaction force torque rate calculation part is added to a target front wheel angle by a front wheel control part, however, even when a steering torque sensor is mounted in a handle 111 and an obtained torque is used instead of the road surface reaction force torque, the same effect can be obtained.

According to the steering control apparatus of this embodiment, in addition to the differential compensation for the handle angle, the handle angle compensation by the road surface reaction force torque is added, so that the handle angle quantity of the driver is compensated, and accordingly, the responsibility and stability of the human-automobile system is improved, and the driving load of the driver at the time of steering such as lane change can be reduced.

Figure 9:
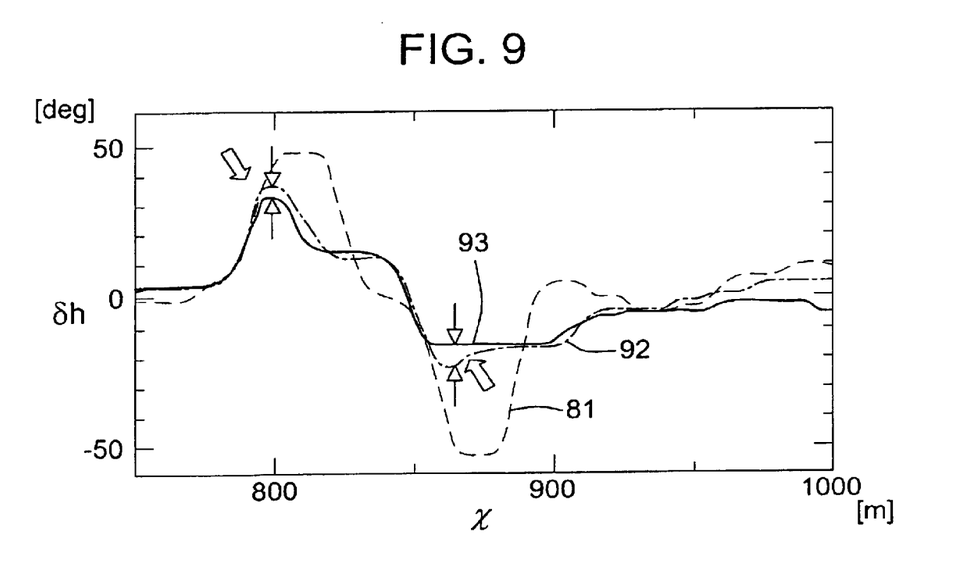
FIG. 9 shows a characteristic explanatory view for explaining the effect of the structure of FIG. 7.

FIG. 9 shows characteristics indicating the effect of the apparatus of this embodiment at the time of a lane change operation. The horizontal axis of FIG. 9 indicates the movement distance, and the vertical axis indicates the handle angle.

In FIG. 9, a dotted line 91 indicates a characteristic in the case of the conventional steering without compensation control of FIG. 3; an alternate long and short dashed line 92, a characteristic in the case of the conventional lead steering control to control only the front wheel angle of FIG. 4; and a solid line 93, a characteristic line of this embodiment shown in FIG. 7.

Although the handle angle rate of the characteristic 93 is not different from the characteristic 92 of the conventional lead steering, since there is a steering increase of the front wheel angle by the SAT feedback, as indicated by white arrows, as compared with the characteristic 92, the lane change can be performed with a small handle angle. As a result, it can be confirmed that as the human-automobile system, the responsibility is improved, and the fluctuation of steering is decreased.

Embodiment 3:

As described in the embodiment 1, by incorporating a device for detecting a driver state (patent document 2, etc.), a reaction delay time constant of a drive can be more accurately grasped. For example, when an awakening level is low and a reaction time is long, a value of $t_1$ is changed to a long one. In the patent document 2, the awakening level is estimated from the vehicle behavior. In the patent document 2, the awakening state of the driver or the awakening level is calculated, and a primary warning and a secondary warning are outputted in accordance with this, and in accordance with this alarm output, setting may be changed to, for example, $t_1$=0.7 sec at the secondary warning, $t_1$=0.5 sec at the primary warning, and $t_1$=0.3 sec at a normal level.

Besides, as another simpler method, the reaction delay time constant (above-mentioned $t_1$) of the driver may be changed in accordance with a vehicle speed.

As stated above, in the case where $t_1$ is changed, since the proportional gain $1/K_2$ is the reciprocal of the arm spring constant of the driver, it may be changed in accordance with the awakening level of the driver or the vehicle speed.

According to this embodiment, on the basis of the awakening level detected by the device for detecting the state of the driver, when the awakening level is low and the reaction time is long, the value of the driver delay time $t_1$ is changed to a long one to compensate the driver delay. Accordingly, when the awakening level is low, since the compensation is performed to be faster and larger, even when the awakening level is low, the driving load of the driver can be reduced.

Similarly, when the proportional gain $1/K_2$ is changed in accordance with the awakening level of the driver or the vehicle speed, the delay of the driver and the steering characteristic can be compensated in accordance with the state of the driver, and the driving load of the driver can be reduced.

Embodiment 4:

In the description of the embodiments 1 to 3, although the description has been given on the assumption that the mechanism/structure of the steering apparatus is the steer-by-wire apparatus, in this embodiment, a description will be given to a mechanism in which a tire and a handle are coupled with each other through a mechanical link 99, and which includes a motor (first motor) for controlling a steering reaction force torque and a motor (second motor) for controlling a front wheel angle, that is, a structure according to a steering angle superimposition mechanism.

Figure 10:
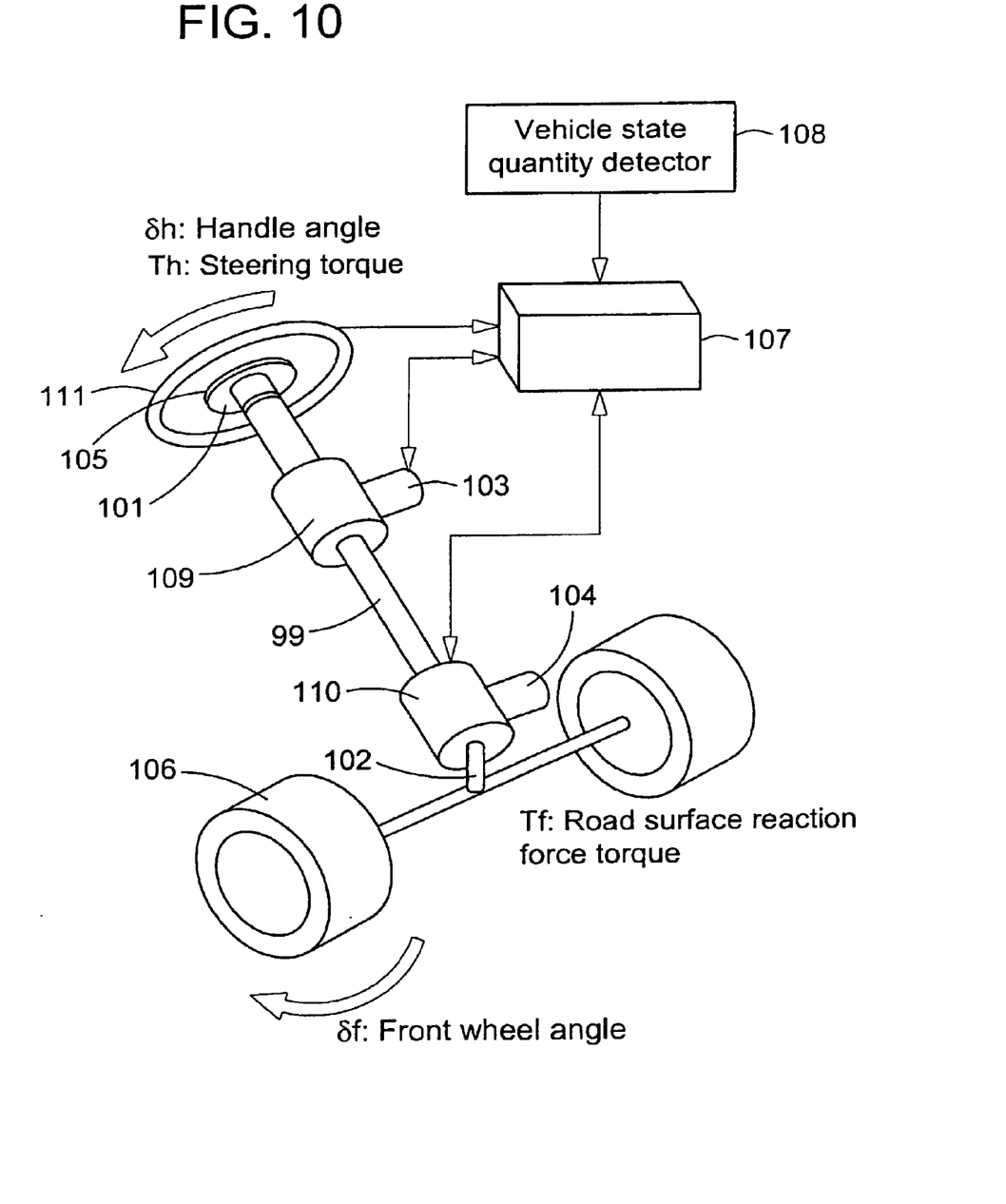
FIG. 10 shows a structural view of a steering apparatus of a vehicle to which a steering control apparatus of embodiment 4 is applied.

FIG. 10 shows a structure of this embodiment, a different point between the steering angle superimposition mechanism and the steer-by-wire mechanism is only a point that the steering shaft of the tire and the handle are coupled with each other through the mechanical coupling 99, and the other points are the same as those described in the embodiments 1 to 3. (Kramer, "Potential Function And Benefits of Electronic Steering Assistance", CSAT, CzechRepublic, 1996).

According to this embodiment, the mechanism is not limited to the steer-by-wire mechanism, and when the mechanism includes the motor for controlling the steering reaction force torque and the motor for controlling the front wheel angle, the same effect as the embodiments 1 to 3 can be obtained.

What is claimed is:

1. A steering control apparatus comprising:
    a steering wheel angle detector for detecting a rotation angle of a steering wheel mounted in a vehicle and outputting a steering wheel angle signal;
    a road surface reaction force torque detector for detecting a road surface reaction force torque from a front wheel of the vehicle and outputting a road surface reaction force torque signal;
    a lag arithmetic part, including a first order lag filter to which the road surface reaction force torque signal is input and which has a specified time constant, for calculating a steering reaction force torque using a signal output by the first order lag filter;
    a first motor fixed to the steering wheel for generating the steering reaction force torque applied to the steering wheel;
    a first control part for controlling the first motor based on the steering reaction force torque;
    a lead arithmetic part, including a first order lead filter to which the steering wheel angle signal is input and which has the same time constant as the first order lag filter, for calculating a steering angle signal of the front wheel using a signal output by the first order lead filter;
    a second motor fixed to the front wheel for controlling the front wheel angle; and
    a second control part for controlling the second motor based on the steering angle signal.

2. The steering control apparatus according to claim 1, comprising time constant setting means for changing the time constant of the first order lead filter.

3. The steering control apparatus according to claim 2, wherein the time constant setting means changes the time constant in accordance with a detection output of a driver state detection device for detecting a state of a driver of the vehicle.

4. The steering control apparatus according to claim 1, wherein the steering wheel and the front wheel are mechanically coupled with each other.

5. A steering control apparatus according to claim 1, wherein the time constant is in a range from 0.3 seconds to 0.7 seconds.

* * * * *